(12) United States Patent
Gu et al.

(10) Patent No.: US 12,111,924 B2
(45) Date of Patent: Oct. 8, 2024

(54) SYSTEM FOR DETECTING MALICIOUS PROGRAMMABLE LOGIC CONTROLLER CODE

(71) Applicant: Georgia Tech Research Corporation, Atlanta, GA (US)

(72) Inventors: Qinchen Gu, Atlanta, GA (US); Abdul Raheem Beyah, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 220 days.

(21) Appl. No.: 17/789,439

(22) PCT Filed: Jan. 16, 2021

(86) PCT No.: PCT/US2021/013764
§ 371 (c)(1),
(2) Date: Jun. 27, 2022

(87) PCT Pub. No.: WO2021/146649
PCT Pub. Date: Jul. 22, 2021

(65) Prior Publication Data
US 2023/0050691 A1  Feb. 16, 2023

Related U.S. Application Data

(60) Provisional application No. 62/962,002, filed on Jan. 16, 2020.

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC . G06F 2221/034; G06F 21/554; G06F 21/552
See application file for complete search history.

(56) References Cited

U.S. PATENT DOCUMENTS

| | | |
|---|---|---|
| 6,163,775 A | 12/2000 | Wlaschin et al. |
| 8,170,352 B2 | 5/2012 | Sandberg |
| 8,365,286 B2 | 1/2013 | Poston |
| 8,479,174 B2 | 7/2013 | Chiriac |
| 9,178,900 B1 | 11/2015 | Li et al. |
| 9,412,073 B2 | 8/2016 | Brandt et al. |
| 10,333,769 B2 | 6/2019 | Schmeelk |
| 10,333,989 B2 | 6/2019 | Jacobs |
| 2006/0034305 A1 | 2/2006 | Heimerdinger et al. |
| 2008/0201129 A1 | 8/2008 | Natvig |

(Continued)

*Primary Examiner* — Kristie D Shingles
(74) *Attorney, Agent, or Firm* — Bryan W. Bockhop; Bockhop Intellectual Property Law, LLC (57) ABSTRACT

A system (100) and method for detecting a malicious programmable logic controller (PLC) code segment (110) in a PLC program corresponding to a specific type of PLC includes a binary parser (112) that parses the code segment (110) into a plurality of functional elements. A variable and function block mapper (114) maps the functional elements into a high-level data structure. A fuzzer (116) generates a behavioral model of the high-level data structure into an automaton (118). A classifier (120) predicts to which processes the automaton (118) corresponds. A detector (122) detects unsafe states in the automaton (118) and that generates an indication of a detected unsafe state.

16 Claims, 3 Drawing Sheets

(56) References Cited

U.S. PATENT DOCUMENTS

| | | |
|---|---|---|
| 2017/0223037 A1 | 8/2017 | Singh et al. |
| 2018/0293389 A1* | 10/2018 | Mahaffey .............. H04L 63/166 |
| 2019/0089722 A1 | 3/2019 | Ciocarlie et al. |
| 2019/0109872 A1 | 4/2019 | Dhakshinamoorthy et al. |
| 2019/0303586 A1* | 10/2019 | Mahaffey .............. H04W 12/12 |
| 2020/0097665 A1* | 3/2020 | Mahaffey .............. G06F 21/577 |

* cited by examiner

PRIOR ART

SYSTEM FOR DETECTING MALICIOUS PROGRAMMABLE LOGIC CONTROLLER CODE

CROSS-REFERENCE TO RELATED APPLICATION(S)

This application claims the benefit of U.S. Provisional Patent Application Ser. No. 62/962,002, filed Jan. 16, 2020, the entirety of which is hereby incorporated herein by reference.

STATEMENT OF GOVERNMENT SUPPORT

This invention was made with government support under grant number DE-OE0000877 awarded by the Department of Energy. The government has certain rights in the invention.

BACKGROUND OF THE INVENTION

1. Field of the Invention

The present invention relates to malicious software detection systems and, more specifically, to a system for detecting malicious code in PLC programs.

2. Description of the Related Art

A programmable logic controller (PLC) is a digital processor that is adapted for controlling mechanical devices. Typically, a PLC includes internal microprocessor logic circuitry, a programmable memory that stores program instructions, a plurality of input lines used to receive sensor inputs from the device being controlled and a plurality of output lines used to send control signals to such devices.

PLCs provide the logic backbone of most supervisory control and data acquisition (SCADA) control systems in all areas, including utility systems, manufacturing systems, medical devices and many others. Because they are ubiquitous and used in many important applications, they tend to be targeted by malicious software.

Figure 1:
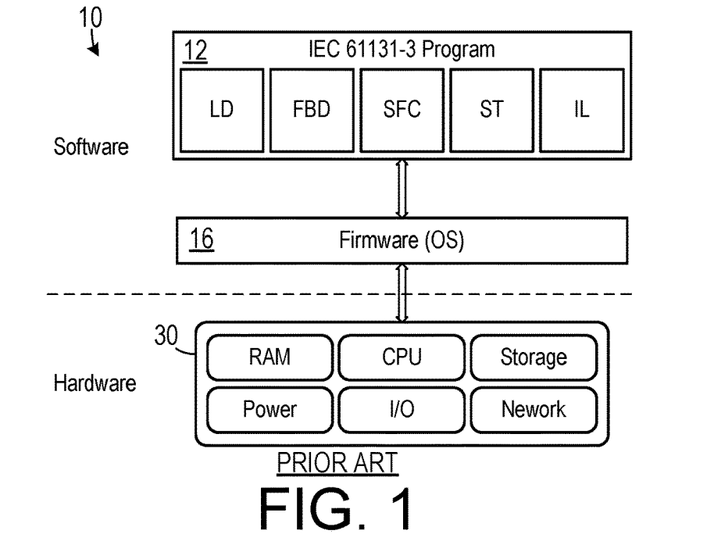
FIG. 1 is a schematic diagram of a prior art structure of a PLC software and hardware stack.
Figure 2:
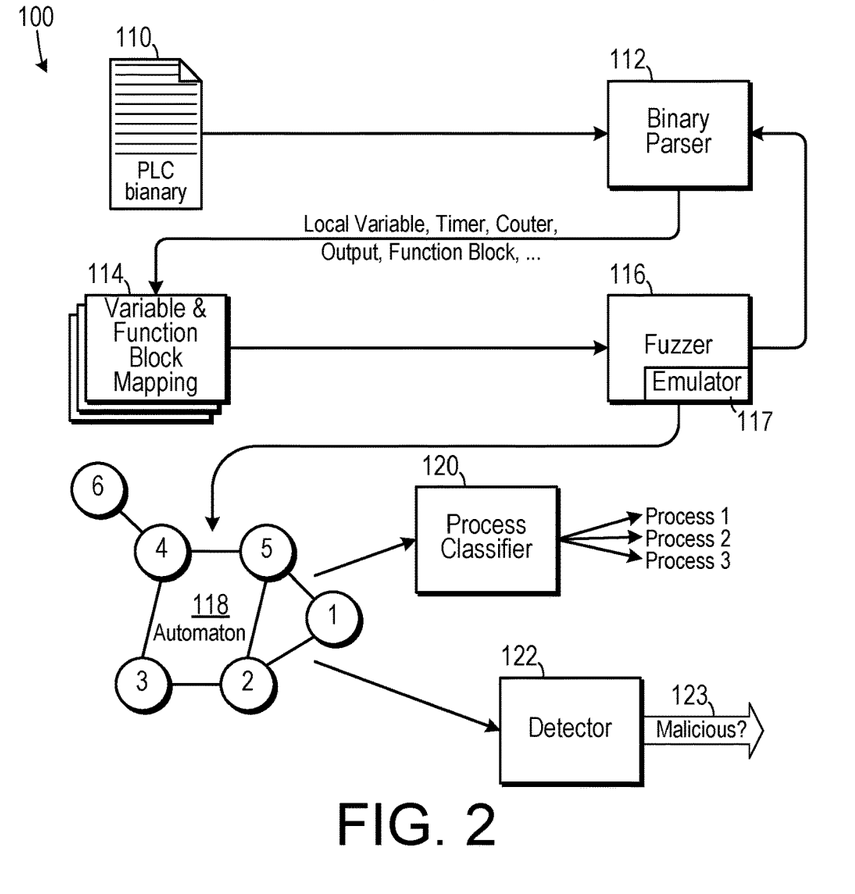
FIG. 2 is a schematic diagram of a PLC program malicious code detection system.
Figure 3:
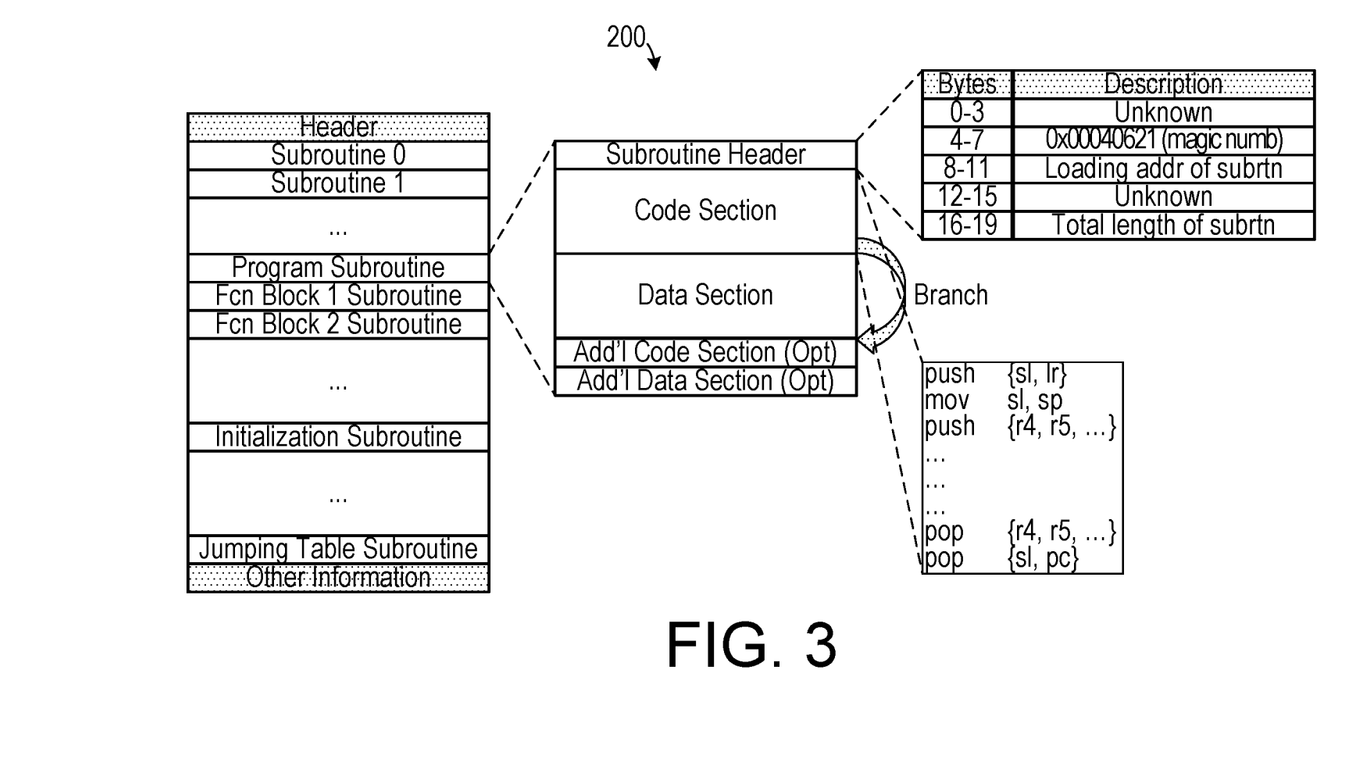
FIG. 3 is a chart showing structure of the disassembly of a PLC program.

PLCs generally are designed for use in industrial processes, such as water treatment facility or power plant. Computationally, a PLC is no different from any other embedded device based on the Von Neumann architecture. However, since it is specifically designed to provide reliability as well as ease of use for process engineers, it has a few notable characteristics. As shown in FIG. 2, a PLC 10 includes a software stack 12 and hardware 30. The bottom layer 16 in the software stack 12 is a customized firmware 16 which handles memory and storage access, physical I/O update, and network communication, etc. This firmware 16 usually includes a real-time operating system (RTOS). Hence it is unlikely to install or run additional applications other than the control logic written by the user. Unlike the general embedded development tools which uses assembly, C/C++ or other high level programming languages, the control logic program can be written in the five languages defined in the IEC 61131-3 standard, among which three are graphical (i.e., Ladder diagram (LD), Function block diagram (FBD) and Sequential function chart (SFC)) and two other are textual (i.e., Structured text (ST) and Instruction list (IL)). These languages are commonly used in the PLC 10 because they have a tight association with the elements in the industrial process. For example, contact and coil in the LD corresponds to a relay's input and output, respectively.

The control logic program is written in a way which processes the input readings and performs computations before updating the outputs. Overall, the firmware handles reading the physical inputs (usually connected to sensors) and passing the values to the control program. Then it runs the program and translates the updated output values into the physical state of the outputs (usually connected to actuators). This process is called a scan cycle. During the lifetime of a PLC's operation, it performs the scan cycle repeatedly.

Fuzzing is a technique that has been used to automate the process of uncovering programming errors in software. With fuzzing, large amounts of pseudo-random inputs are sent to a target application. A fuzzing system determines whether each input triggers faulty behavior in the target application. Fuzzing can also be useful in finding memory corruption bugs that often trigger sophisticated exploits.

A "logic bomb" is a sequence of malicious code that is inserted into software that is activated upon the occurrence of a specific event. Such sequences are designed to lie dormant until they are activated through the normal course of program execution. For example, a logic bomb inserted into a transactional program could include a counter that is initially set to a high value and that is decremented each time a certain type of transaction is executed. The counter reaching zero then triggers execution of a destructive routine.

Logic bombs can be particularly hard to detect, as the constituent code can be broken into smaller innocuous segments that can be distributed across different sections of the software into which they are inserted. Once a segment is executed, control can be passed to a successive segment to execute the entire sequence. Each individual segment, by itself, can appear to be a normal part of the targeted software.

Threats against PLC systems are quite prevalent and can be quite costly, especially in critical infrastructure device controlled by PLCs. Targeted attacks which can damage the physical processes have become quite frequent due to the high value of these systems. Industrial control system (ICSs) that are controlled by PLCs tend to be quite vulnerable.

Generally, there are two categories of systems used to detect malicious PLC code. The first category focuses on the dynamics of the system physics to ensure that they do not deviate from the control objective. The second category analyzes the control software, i.e., the PLC program, to ensure that the code conforms to certain rules. However, most monitoring techniques tend to employ passive defenses. They can only be deployed within and tailored to certain systems, waiting for the anomalies to appear.

However, in a sophisticated attack, the malicious code that causes the anomalies may be buried deep in the form of a logic bomb, which will only be set off when certain conditions are met. Such conditions can be designed as difficult to meet as the attacker desires. Even a simple timer that takes long enough (e.g., six months) to trigger the malicious piece of code can convince a system administrator that the system is normal during a lengthy (e.g., three months) test stage.

Although examining the source code of the PLC program may detect the injected malicious code, the source code is almost always unavailable for analysis. Such techniques work the best during an insider attack, where the source code can be cross referenced with the pro-gram running on the PLC. A sophisticated attacker can pre-compile the source code into binary files before sending them as payload to the target, rendering source code-based analysis methods ineffective. As a result, these binary files found during propagation can be hard to analyze, especially because it is almost impossible to define what should be considered malicious without knowing for which physical process the program is intended.

Therefore, there is a need for system for detecting malicious software in PLC programs.

SUMMARY OF THE INVENTION

The disadvantages of the prior art are overcome by the present invention which, in one aspect, is a system for detecting a malicious programmable logic controller (PLC) code segment in a PLC program corresponding to a specific type of PLC. The system includes a binary parser that parses the code segment into a plurality of functional elements. A variable and function block mapper maps the functional elements into a high-level data structure. A fuzzer generates a behavioral model of the high-level data structure into an automaton. A classifier predicts to which processes the automaton corresponds. A detector detects unsafe states in the automaton and that generates an indication of a detected unsafe state.

In another aspect, the invention is a method, operable on a digital computer that includes a tangible non-volatile memory, for detecting a malicious programmable logic controller (PLC) code segment in a PLC program corresponding to a specific type of PLC. The code segment is parsed into a plurality of functional elements.

The functional elements are mapped into a high-level data structure.

A behavioral model of the high-level data structure is generated with a fuzzer into an automaton. The behavioral model is classified so as to predict to which processes the automaton corresponds. Unsafe states are detected in the automaton and an indication of a detected unsafe state is generated.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Users can upload suspicious PLC programs to the present system while providing minimal contextual information about the physical process before commencing automated analysis of the program's behavior. The system checks the behavior of the program which can cause damage in the operational technology (OT) domain, such as driving a motor to a dangerously highspeed or overflowing the tank. The present system has an advantage of not being tied to the length of wait time to trigger the malicious logic in the program. Moreover, it can be used even as the complexity of the program grows, as it does not have the path explosion problem that is typically encountered in symbolic execution methods.

As shown in FIG. 2, in one embodiment of a system and method for detecting a malicious programmable logic controller (PLC) code segment in a PLC program, the code 110 is initially parsed with a parser 112 so as to extracts the functional elements required for the next stage of analysis. These elements can include, for example: local variables, timers, counters, outputs, function blocks, etc. A variable and function block mapper 114 maps the functional elements into a high-level data structure. A fuzzer 116 generates a complete behavioral model of the PLC program in the form of an automaton 118, leveraging the parser 112 as an interface. A process classifier 120 predicts to which process of a plurality of processes the automaton 118 corresponds. A detector 122 checks the automaton 118 for unsafe states as well as the paths leading to these states and generates an indication 123, such as a visually perceptible alert, indicating that potential malicious code has been detected when such code has been detected.

Fuzzing is a technique that typically uses a large set of random or invalid data as inputs to a program to find crashes, memory leaks, or vulnerabilities such as buffer overflow. The basic idea is to leverage the corner cases in the inputs to trigger the unintentionally buggy behavior of the program. For example, a program may take a user input with the assumption that the input will be an integer. If the assumption is not held when the program executes, either because of the negligence from the user or because of intentional exploitation by an attacker, a lack of "sanity check" in the program may lead to an unstable or unpredictable state of the program.

Figure 5:
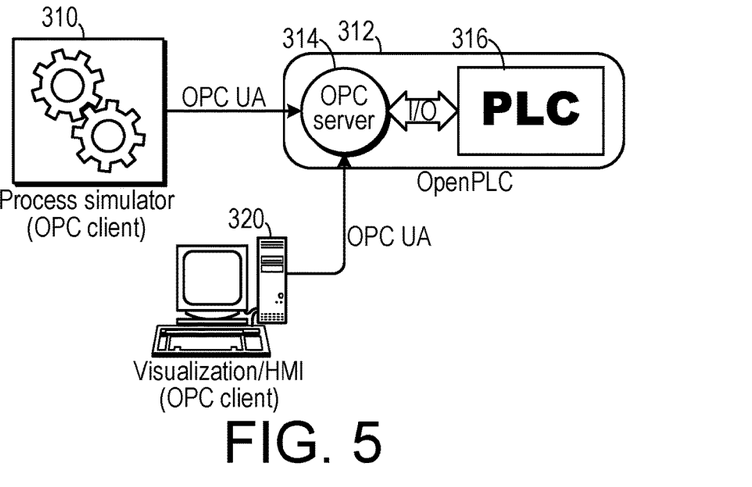
FIG. 5 is a schematic diagram showing one embodiment of a process and PLC simulator architecture.

The system 100 can be adapted to the one of the many specific types of PLC on which the code being examined is to run. (One experimental embodiment employed an ARM926EJ-S based Schneider Modicon M241 PLC as an example to determine the anatomy of the PLC program binary.) The fuzzer can include an emulator 117 that is programmed to emulate execution of the high-level data structure that is used to program the specific type of PLC. This can be done by applying test case data to the high-level data structure and by detecting state transitions in the specific type of PLC. The PLC binary code is parsed with the binary parser module before the fuzzer interacts with it. The emulator can include a digital computer 320 with a tangible non-volatile memory that includes a program that runs a model of the specific type of PLC (as shown in FIG. 5).

Understanding the Binary Structure: As each PLC model is has different CPU architectures and runs different firmware, the PLC program written in the same high-level IEC 61131-3 representation can be compiled into the binary very differently as well. Unlike the x86-based platform, there is no standard PLC format such as the Executable and Linkable Format (ELF) and hence no tool is readily available to parse the PLC program binary.

A PLC program is usually generated from a complex-structured project consisting of many types of elements, such as PLC hardware configuration, communication interface, task schedule, Program Organization Unit (POU), etc. The system attempts to recover the POU from the binary. To do so, a batch of "empty" projects which only contain the minimal project files can be used to replace the main POU with simple Structured Text (ST) instructions. These projects can then be compiled into binaries and compared to determine how differences in their source code translate into the differences in their binaries. To mitigate the noise due to the metadata, such as time information that is added to the binary, the same project IO times are compiled and the results are XOR'ed to find the locations of bytes that change over each compilation, i.e., that are irrelevant to the actual program logic. These bytes are then used as a mask that is OR'ed with each binary, which helps to better find the differences between binaries due to the program logic. One experimental embodiment employed a Python library called "Capstone" to disassemble the binaries.

The following tables show the (a) ST code and (b) the disassembly for a program with a value assignment:

| (a) ST code |
| --- |
| PROGRAM PLC_PRG |
| VAR |
|   I_1 : BOOL; |
|   O_1 : BOOL; |
| END_VAR |
| O_1 := I_1 |

| (b) Disassembly | | |
| --- | --- | --- |
| 00002000 | e5db4000 | ldrb r4 , [ fp ] |
| 00002004 | e5cb4001 | strb r4 , [ fp , # 1 ] |

The following tables show the (a) ST code and (b) the disassembly for a program with a value assignment and a logical NOT:

| (a) ST code |
| --- |
| PROGRAM PLC_PRG |
| VAR |
|   I_1 : BOOL; |
|   O_1 : BOOL; |
| END_VAR |
| O_1 := NOT( I_1 ) |

| (b) Disassembly | | |
| --- | --- | --- |
| 00002000 | e5db4000 | ldrb r4 , [ fp ] |
| 00002004 | e2244001 | eor r4 , r4 , # 1 ; NOT( ) |
| 00002008 | e5cb4001 | strb r4 , [ fp , # 1 ] |

In the case of ST code in these tables, the major difference was found to be an insertion of a single exclusive or instruction EOR in the ARM instruction set architecture (ISA).

One challenge in disassembling the binary is that the code sections and data sections are typically mixed together. While reversing engineering the binary, it can be found that the program section is actually wrapped inside a set of subroutine entry and exit instructions, just as every other subroutine in the disassembly does. Each subroutine begins with push{sl, lr}, mov sl, sp and push {r4, r 5, . . . } which pushes a list of registers that is used in this subroutine to the stack. At the end of the subroutine is pop {r4, r5, . . . }, which pops the same list of registers that were pushed into the stack at the beginning of the subroutine, followed by pop {sl, p c}, which restores the value of register sl but loads the value of lr into pc. lr is a special-purpose register in ARM called the link register, which holds the address to return to when a function call completes. Hence the subroutine returns to its caller. By tracing all the memory accessing instructions such as ldr and str, it has been found that most directly accessed addresses from the subroutine are immediately after the code section of the subroutine. After excluding all the code and data sections found with this technique, the binary is left with a 20-byte header before the code section of each subroutine, as well as some meta data at the beginning and end of the binary.

The general structure 200 of the disassembly can be seen in FIG. 2, where the program subroutine is one of the subroutines contained in the binary, followed immediately by the function block subroutines that are called in the program. The initialization subroutine initializes all the constants and default value of the variables used in the program, including the output. The jumping table subroutine builds a jumping table that maps the referenced address used by a caller to the actual address where the callee subroutine is loaded into the memory.

Input, Output and Internal Variables: To record the program's state, the system identifies the input, output and the internal variables used in the programs and track their values. The input and output (UO) variables are directly mapped to the physical inputs and outputs on the PLC. During each scan cycle, the input variables are first updated by scanning the physical inputs. At the end of the scan cycle when all the program logic has been evaluated and the output variables have been updated, the circuit in the PLC drives the physical outputs to the states corresponding to the output variables. The internal variables are used to store temporary computation results and only reside in the memory. Although they are not mapped to any physical pin on the PLC, the values of the internal variables are usually persistent through the scan cycle.

One can trace the execution of a few programs and compare the disassemblies with the source code to understand how the input, output and internal variables are represented in the binary. For example, in the following program snippet shown below, two input variables (Leve/High and Leve/Empty), one output variable (InValve2) and two internal variables (NOT3_OUT and AN D34_0 UT) are defined. The disassembly has been matched with the corresponding ST code. The value of pc in ARM is 8 bytes larger than the current instruction's address. By tracing the memory access through fp, the frame pointer register, the address stored in the data section can be matched with the variable. The disassembly of every assignment instructions in the ST program ends with a store instruction, such as strb.

A sample program to demonstrate the input, output and internal variable representations is show as follows:

| (a) ST code |
| --- |
| PROGRAM PLC_PRG<br>VAR<br>   LevelHigh AT % IX1.3 : BOOL;<br>   LevelEmpty AT % IX1.0 : BOOL;<br>   InValve2 AT % QX0.1 : BOOL;<br>   NOT3_OUT : BOOL;<br>   AND34_OUT : BOOL;<br>   SR3 : SR;<br>   ...<br>END_VAR<br>NOT3_OUT := NOT( LevelEmpty );<br>SR3 ( SET1 := LevelHigh , RESET := NOT3_OUT );<br>InValve2 := AND34_OUT;<br>... |

| (b) Disassembly |
| --- |
| ; code section |
| ;NOT3_OUT := NOT( LevelEmpty ); |
| 00001FA8    bcb49fe5    ldr fp , [ pc , #0x4bc ] |
| 00001FAC    0040dbe5    ldrb r4 , [ fp ] |
| 00001FB0    014004e2    and r4 , r4 , # 1 |
| 00001FB4    014024e2    eor r4 , r4 , # 1 |
| 00001FB8    a8b49fe5    ldr fp , [ pc, #0x4a8 ] |
| 00001FBC    0040cbe5    strb r4 , [ fp ] |
| ; SR3 ( SET1 := LevelHigh , RESET := NOT3_OUT ) ; |
| 00001FC0    04d04de2    sub sp , sp , # 4 |
| 00001FC4    a0b49fe5    ldr fp , [ pc , #0x4a0 ] |
| 00001FC8    0040dbe5    ldrb r4 , [ fp ] |
| 00001FCC    084004e2    and r4 , r4 , # 8 |
| 00001FD0    a441a0e1    lsr r4 , r4 , # 3 |
| 00001FD4    88b49fe5    ldr fp , [ pc , #0x488 ] |
| 00001FD8    0040cbe5    strb r4 , [ fp ] |
| 00001FDC    7440dbe5    ldrb r4 , [ fp , #0x74 ] |
| 00001FE0    0140cbe5    strb r4 , [ fp , # 1 ] |
| 00001FE4    74549fe5    ldr , r5 , [ pc , #0x474 ] |
| 00001FE8    05408be0    add r4 , fp , r5 |
| 00001FEC    00408de5    str r4 , [ sp ] |
| 00001FF0    64b49fe5    ldr fp , [ pc , #0x464 ] |
| 00001FF4    00409be5    ldr r4 , [ fp ] |
| 00001FF8    0fe0a0e1    mov lr , pc |
| 00001FFC    04f0a0e1    mov pc , r4 |
| 00002000    04d08de2    add sp , sp , # 4 |
| ... |
| ; InValve2 := AND34_OUT ; |
| 00002348    b4b09fe5    ldr fp , [ pc , #0xb4 ] |
| 0000234C    0040dbe5    ldrb r4 , [ fp ] |
| 00002350    b0b09fe5    ldr fp , [ pc , #0xb0 ] |

-continued

| (b) Disassembly |
| --- |
| 00002354    0050dbe5    ldrb r5 , [ fp ] |
| 00002358    000054e3    cmp r4 , # 0 |
| 0000235C    0100000a    beq #0x2368 |
| 00002360    025085e3    orr r5 , r5 , # 2 |
| 00002364    000000ea    b #0x236c |
| 00002368    0250c5e3    bic r5 , r5 , # 2 |
| 0000236C    94b09fe5    ldr fp , [ pc , #0x94 ] |
| 00002370    0050cbe5    strb r5 , [ fp ] |
| ... |
| ; data section |
| 00002404    0x00000163    ; AND34_OUT |
| 00002408    0x00000000    ; % QX0 |
| ... |
| 00002468    0x00000158    ; NOT3_OUT |
| 0000246C    0x00000001    ; % IX1 |

Each internal variable is stored in a unique address, while the input and output variables are referenced with their index (e.g., 0 in % QX0). This can create a confusion between the I/O variables as both % Q X0 and % IX0 are accessed with 0x00O00O0O. To solve this issue, one can scan the entire code section of the program subroutine, and record whether the UO index stored in an address was used for read/write or both. Because it is not allowed to write to an input, any write to the index stored in an address means that the address is holding the index of an output variable. Hence, the rest of the indices that are only read from belong to the input variables. Although it is syntactically legal to only read from an output throughout the entire program without once writing to it, it is meaningless and unlikely to appear in a PLC program.

Function Blocks: In addition to the logical operations involving I/O and internal variables, PLC programs also have a special programming element called the function blocks (FBs). A function block is similar to a function, except that it may contain internal states which causes it to behave differently when being invoked multiple times with the same input. Some FBs are stateless such as MOV. However, there are nine standard FBs defined in the IEC 61131-3 standard(6) that are stateful. For example, SR3 is a Set/Reset (SR) function block in the sample program shown in FIG. 14, which shows a sample PLC program disassembly. The names and description of the nine standard FBs are shown in the following table showing stateful standard function blocks:

| Name | Description |
| --- | --- |
| R_TRIG | Rising edge detector. It will activate the Q output when a rising edge is detected on the CIK input. |
| F_TRIG | Falling edge detector. It will activate the Q output when a falling edge is detected on the CIK input L |
| SR | Set/Reset flip flop. A leading edge on the S1 input activates the Q output. A leading edge on the R input deactivates the Q output. S1 has priority over R |
| RS | Reset/Set flip flop. A leading edge on the S input activates the Q output. A leading edge on the RI input deactivates the Q output. RI has priority over s. |
| TP | A pulse timer that enables the Q output for a preset PT amount of time after the IN input is enabled. |
| TON | ON delay timer that enables the Q output after the IN input is enabled for a preset PT amount of time. |
| TOP | OFF delay timer that disables the Q output after the IN input is disabled for a preset PT amount of lime. |
| CTU | Up counter. It increments the CV value by one on each rising edge of the CU input. When the CV reaches the preset value PF the output Q is enabled. A rising edge is on the R input resets CV to o. |

| Name | Description |
| --- | --- |
| CTD | Down counter. It decrements the CV value by one on each rising edge of the CD input. When the CV reaches the preset value PV, the output Q is enabled.<br>A rising edge is on the LD input loads PV to CV. |

In the program subroutine disassembly, each function block (FB) starts with sub sp, sp, #4 and ends with add sp, sp, #4, because the parameters inside the parenthesis of the FB need to be stored in a contiguous data structure, whose address is pushed into the stack. The program then calls the subroutine corresponding to the FB with move pc, r4, which performs the operation on the data structure and returns to the main program. All internal values and results are contained in the same data structure, residing in the same region of memory as other variables.

A key to recovering the information of FBs is to match the address of the subroutine being called with the type of FB. This can be done in two steps. First, the address being called needs to be converted to the actual memory address according to the jumping table. In the second step, the memory address is traced to one of the subroutines following the main program by checking their headers. These subroutines are the FBs used in the program. One experimental embodiment sampled 20 programs, which covered all the standard FBs and manually compared the code section of all the subroutines corresponding to the same FB. The result showed that every FB has a subroutine with constant code section. The data section can differ due to the changing memory allocation in each program. Hence, these subroutines were collected as signatures of FBs and a mapping was generated between them. Therefore, this embodiment recovered the type of each FB for the subroutine calling encountered in the program.

Building the Automaton: With sufficient understanding of the binary program being executed by the PLC, the system finds a way to interact with the I/O of the program and monitor its state. Normally, the PLC running the program can be seen as a "black-box" in which only the input and output can be accessed via the physical I/O of the PLC, while the internal variables and FBs are inaccessible to the user. There are two methods to address this issue. The first method is based on the direct connection to the JTAG port, which is a debugging interface on the printed circuit board (PCB) of the PLC. The second method is based on the offline execution of the binary using a customized emulator that can simulate the execution of the assembly. Both methods can be used as an interface to the PLC program and facilitate the fuzzing process which generates the automaton representing of the program's behavioral model.

Binary Execution Emulation: One way to interact with the PLC program is to emulate the execution of the binary file. Obtaining the binary file can be done via an interception of malicious payload or extraction from the PLC itself. Depending on the model of the PLC, the latter may be implemented differently. For example, the Schneider M241PLC used in one experimental embodiment, supports copying the entire content of the flash memory including the binary program to an external SD card. A more generic alternative is to dump the flash memory data via its digital interface such as SPI.

The next step is to execute the binary in a software emulator. Generally, programs for emulating CPU execution, such as QEMU or Unicom, are not designed for executing PLC programs. One reason for this is that every ldr and str instruction requires the corresponding memory address to be accessible. This could be difficult to handle when the confusion rises due to the I/O variable addressing problem. One solution is to implement our PLC-oriented framework to facilitate access to the register and memory, which results in a better control over the program's execution. This emulation framework addresses this issue by tracking the memory access history and label the address of the I/O index stored in the data section with the corresponding variable type. Another advantage of our emulation framework is that it dynamically recognizes the FB structure and FB subroutine invocation using the signatures collected. Hence, special procedures can be carried out to handle temporal-related FBs, which will be explained in more detail below.

Timers and Counters: The system treats timer and counter FBs differently from their original behavior for optimization. Originally, timers depend on temporal changes. However, this is not only difficult to implement, but also unnecessarily costly as temporal values have no minimum unit (i.e., it is a continuous value) and can theoretically take an infinite number of values. The essence of a timer lies in whether it is not activated, running or has expired (i.e., reached the PT). In other words, as long as less than PT time has passed since a timer is activated, the output of the timer would remain unchanged, hence the state of the entire program remains unchanged despite the increasing timer value. Therefore, the system simplifies the automaton by discretizing the timers: if a timer is activated and starts running, the system records its PT as the transition and forces it to expire in the next scan cycle, simulating that a PT amount of time has passed.

Although a counter takes discrete values, it would still be unnecessary to test all values as the output of the counter does not change until it reaches the preset value. Therefore, similar to the timers, a counter can be simplified and discretized into three states: not counting, counting, and expired (i.e., reached the PV for CTU, or 0 for CTD). Whenever a counter is triggered and starts counting, it is forced to expire in the next scan cycle, simulating that PV times have been counted. The PV will be recorded as the transition.

With the aforementioned optimizations, the system is able to generate the automaton incorporating the temporal information. It can also reduce the time cost in certain conditions, e.g., a counter with extremely large PV to trigger a deeply buried logic bomb.

Fuzzing: With either JTAG or binary execution emulation as an interface to interact with the program, the system uses fuzzing to build the automaton representation of the PLC program. A PLC program essentially defines a set of rules which update its output based on its current state and the input given. As random numbers are rarely useful in the control system involving PLC, the input variables defined by the program almost always become the only source of input to the program. Additionally, a PLC program operates on the input deterministically with logic expressions and FBs, and can only have limited number of storage elements, which means that it can be represented as a deterministic finite-state machine (FSM,) also known as the deterministic-finite-state automaton (DFSA). Without loss of generality, the system formally defines the automaton A for a program P as a quintuple (S, Δ, T, $s_0$, F), including:

a finite set of states S;
a finite set of input Δ;
a transition function T: S×Δ→S
an initial state or start state so $s_0 \in S$,
a set of accept states F⊆S.

Each state s E S can be a combination of the output variables (e.g., % QX0), denoted as O, the internal variables V and the FBs' states F. The system defines the state of each of the nine FBs such that the output (Q) of the FB is dependent and only dependent on the input to the FB and its state.

Input. Each input i∈Δ can be a combination of the input variables (e.g., %!XO), denoted as I, the timers T and the counters C. Because in each scan cycle of the PLC program, the input values are always updated, any input δ∈Δ must at least contain I. $I_{max}$ is also defined based on the number of inputs in the program, e.g., a 12-bit input means $I_{max}$=0xFFF. T and C are optional depending on whether any timer or counter FB is activated.

Figure 4:
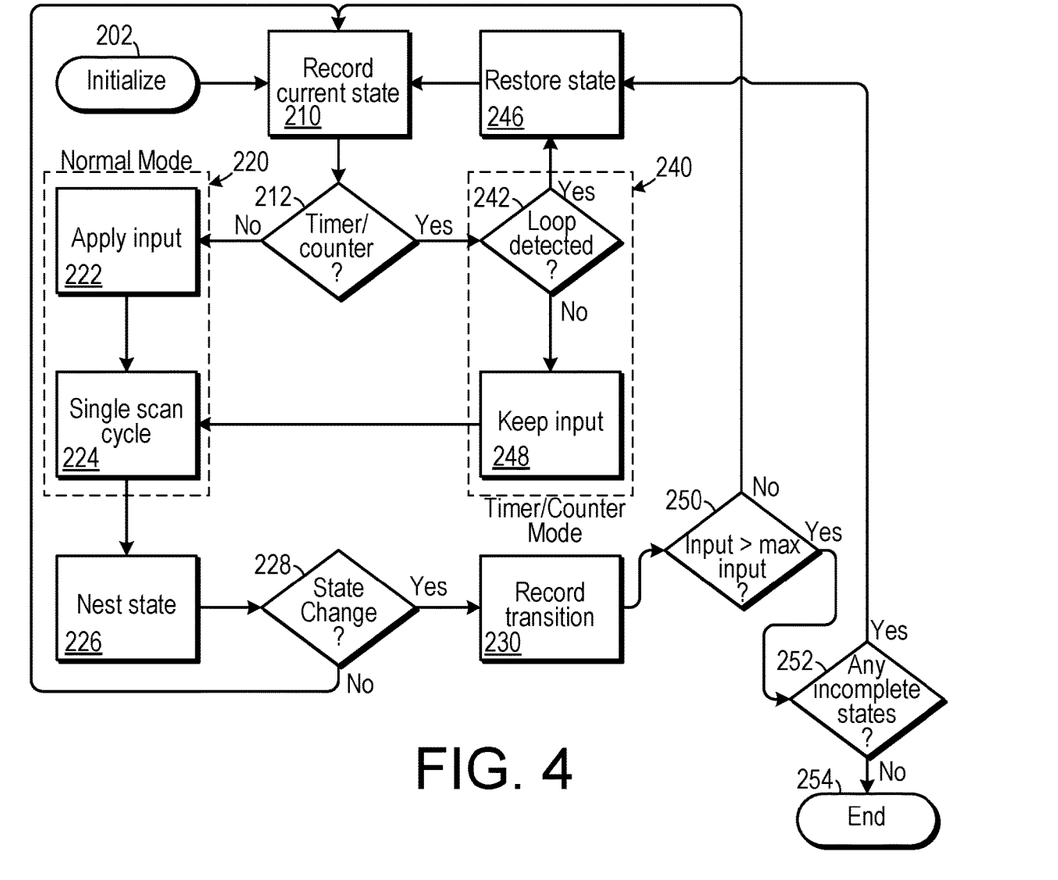
FIG. 4 is a flow chart showing implementation of one embodiment of a fuzzer that generates an automaton.

The fuzzing process is depicted as a flowchart in FIG. 4. The process begins with the following initialization 202:
reset all input variables;
deactivate all timers and counters, reset all timers' elapsed time (ET) and counters' accumulator (Acc);
initialize all internal variables and output variables to the values specified in the initialization subroutine.

The fuzzing process in general is carried out similar to the execution of PLC programs, i.e., a loop of actions consisting of reading the input, executing scan cycle, and updating the output. The initial state $s_0$ is referred to as the current state, $S_\alpha$ 210. After a transition τ∈T is applied (222 and 248). A single scan cycle is executed on the PLC program 224, updating all its internal variables, FBs, output variables, etc. The new state is referred to as the next state, $s_\beta$ 226. This process iterates until the entire automaton is generated 254.

The automaton that will be generated is equivalent to a directed multigraph, with each state in the automaton as the node, and each transition as the edge. Starting from $s_0$, the system records the maximum $I_p$ that has been tested on each state $s_i$; in a mapping M: $s_i \to I_p$, where $s_i \in S$ and $0 \le I_p \le I_{max}$. If no timer or counter is activated in the current state 212 the fuzzing is in normal mode 220, otherwise it is in timer/counter mode 240.

In normal mode 220, the objective is to traverse through the entire automaton with depth-first search (DFS), by enumerating every $I_p$ value in every state $s_i$, while updating the mapping M with $s_i \to I_p+1$. If a new state $s_j$ is discovered 228, M is updated with sj→0 230. Otherwise, the process goes into the next iteration 210. If M($s_i$)>$I_{max}$ 250, the DFS reaches a node with no more outwards edge that has not been traversed 252. In this case, the automaton needs to be restored to a state $s_k$ (if there is any) for which M ($s_k$)≤$I_{max}$ 246. Otherwise, the process goes into the next iteration 210. For any input $I_x$ that causes the state of the automaton change from $s_\alpha$ to $s_\beta$, a transition τ will be recorded iff $s_\alpha \ne s_\beta$ 230.

In timer/counter mode 240, at least one timer or counter is activated in the current state. Since this is a transient state, the objective is to reach a stable state (i.e., no timer or counter) and resume normal mode. If a timer or counter, characterized by the presence of a loop, is detected 242 the input will be kept unchanged from the last transition 248. During this mode 240, new states will not be added to M. All transitions will be recorded in the automaton. However, if a loop of states is detected 242 in the timer/counter mode 240, the automaton needs to be restored to a state $s_k$ for which M($s_k$)>$I_{max}$ before going into the next iteration 210. The fuzzing completes when M($s_i$)>$I_{max}$, $\forall s_i \in S$.

In one representative embodiment, the automaton includes a directed multigraph that includes a plurality of states in which each state is represented as a node and in which each state transition is represented as an edge. The classifier indicates a total number of states in the automaton and average degree of the multigraph, wherein the average degree equals a total number of edges in multigraph divided by a total number of nodes in the multigraph. The classifier also predicts to which processes the automaton corresponds by comparing the average degree of the multigraph to average degrees of other known processes. The detector compares the average degree of the multigraph to an average degree of known safe code and wherein the system indicates that the code segment is suspicious when the average degree of the multigraph is less that the average degree of known safe code.

Unlike traditional computer programs and software, PLC programs make data collection harder in a large scale. Because most PLC programs are written for specific physical systems, it is unlikely that more than one implementation will be available for each system. Moreover, programs written for existing ICS may not be willingly shared, as it may interrupt the normal operation of the system and leak the confidential information. This may lead to economic loss or even cause targeted attacks. To make data collection even more difficult, various models of PLCs may be used in the industrial environment. Hence it either requires more effort in reverse engineering or collecting more data to increase the number of programs for a specific PLC.

As shown in FIG. 5, a process and simulator architecture employed can include a process simulator 310, and open PLC design 312, which can include an Object Linking and Embedding (OLE) for Process Control (OPC) protocol 314, more specifically OPC Unified Architecture (OPC UA) and a PLC 316, and an OPC client visualization device (such as a computer system including a processor and a tangible non-volatile memory) 320. The OpenPLC design can exchange I/O data with a process simulator program and a human-machine interface (HMI) software.

The system includes two stages: a classifier, which determines whether a suspicious control program is written for a given physical process; and detector, which searches for malicious states that the program can run into and finds the conditions to trigger such states. One experiment obtained the dataset consisting of the automata extracted from PLC programs. These automata are then used as the input to the classifier and the detector. We evaluate our work by answering the following questions: (1) Can the classifier correctly predict which process an automaton corresponds to? (2) Can the detector determine whether a program is malicious reliably?

To classify these PLC programs efficiently, the system analyzes several features that can be extracted from their corresponding automata: (1) Number of States. The number of an automaton's states is a basic feature. Based on the different approaches of implementation, the number of states of PLC programs which corresponds to the same process may vary greatly. However, the number of states of programs that correspond to the same process was within a range. The system preferably uses the number of states instead of transitions because it is usually more representative of the process. (2) Average Degree. In graph theory, the degree of a node indicates the number of edges which end with or start from it. One edge in a graph is associated with two types of degrees, average degree can be calculated by num_edges/num_nodes. Comparing the average degree of different programs indicates that they are highly correlated with the type of the process the program is associated with. It was observed that the scattered plot corresponding to each process approximates a straight line, indicating a strong correlation between the number of transitions and the number of states. Additionally, different processes can be visually separated in the plot, suggesting that the average degree can be an important feature in the classification. (3) Degree Variance. There are many differences among the nodes. Hence, the system defines three types of nodes: border-node, pass-node and pivot-node. Border-node refers to the node with a relatively small degree, and most of its edges are pointing to, instead of starting from, it; pass-node refers to the node with only one edge in and one edge out; pivot-node refers to the node with a relatively larger degree compared to the average. These types of vertices are usually sufficient to describe a PLC automaton. For instance, the implementation of a function can be made of a sequence of states, and there are many functions of which the states can only transform from the previous to the next, i.e, if a function is made of n states $s_1, s_2 \ldots s_n$, then $s_i$ is only linked to $s_i+1$. That means each vertex in this graph has one in-degree and one out-degree, which is outlined as pass-node. Instead of directly using the proportion of these three types of nodes as a feature, we consider the variance of degree a better choice. With a larger variance of degree, a graph is usually much more complicated, with more types of nodes in addition to border-node, pass-node and pivot-node. Mean-while, with a smaller variance, a graph tends to be simpler. (4) Triggers. A PLC program may contain several function blocks such as F_TRIG or TON. These triggers are designed to implement specific functionalities. Therefore, the types of triggers and the number of triggers a program has used can be useful information to infer which category of process to which the program belongs. Note that if both Number of States and Average Degree are chosen as features, it implies that the number of transitions is also considered.

Feature Generalization: In one embodiment, four features are chosen to classify the PLC programs' automata: Numbers of Stages; Number of Triggers; Average Degree and Degree Variance. The number of states and the number of triggers are fundamental elements that are associated with the function of a PLC program. Regarding the average degree, programs that implement the same functionality can have different automata. Starting with a minimal version, a variant of the most minimal automaton could be thought as new transitions which transform the original states to redundant states, denoted as $s \rightarrow r(s)$. Thus, there should also be new transitions $r(s_i) \rightarrow r(s_j)$ corresponding to the original transitions $s_i \rightarrow s_j$. If the origin graph has n nodes and m edges, then in the extended graph, there are n+n=2n nodes and m+n+m edges. Further, there would be k*n nodes and k*m+(k−1)*n edges with k redundant extensions. The ratio of edges and nodes is m/n+(k−1)/k, which is quite close to m/n. Therefore, it is sufficient to use average degree as a feature.

Degree Variance: as described above, the system describes three types of nodes, namely border-node, pass-node and pivot-node. However, there are many more different varieties of nodes in other PLC processes. Hence the one way to use this kind of feature is using the proportions of summarized special nodes if the classifier knows the samples in advance. However, in many cases the classifier has no idea what processes the PLC programs are from. To address this issue, the feature Degree Variance can be used. Degree Variance which to some extent implies the proportions of different types of nodes. Experiments have shown that this feature contributes greatly.

SVM-based Classification. In one implementation, a classification method is based on support vector machine (SVM). There are four features introduced above: Number of States, Average Degree, Degree Variance and Triggers. Therefore, one can directly use these features to test the effectiveness. In addition, one can adjust the features to make them more specific based on SVM. One can further divided the Triggers feature into four specific features: (1) R TRIG and F_TRIG; (2) SR and RS; (3) TP, TON and TOF; (4) CTU and CTD, based on their functionalities. For example, CTU and CID are both counters. One can then split our data into training set (⅔) and testing set (⅓). With the SVM classification method, the system has been shown experimentally to achieve an average accuracy of 98.9%.

Rule-based Classification. When used in real scenarios, the system usually faces a binary classification problem rather than a multiclass one, i.e., the output will be whether the target program is associated with a certain physical process. In this case, training a machine learning model is infeasible due to lack of large samples of data. Hence a rule-based method can be used. The rule-based method classifies programs based on rules decided by administrators.

By observing the features, it has been found that based on Average Degree, programs can be divided into two classes: those that have a large average degree (e.g., more than one thousand) and those that have a smaller average degree. One experimental embodiment applied the rules in the following two steps: in the first step, it classified the programs into which of the two big classes they belong to by their Average Degree; in the second step, it used a variant of the sigmoid function to calculate the similarity between the program and the other two categories. It was found that the rule-based classification reached an accuracy of 95.2%. Among those programs which are misclassified, more than 50% are attack version programs (i.e., they include malicious code). Therefore, the attack version of a program does have a difference with the normal version programs, which can help in using detector to detect whether a program is malicious.

In the situations where manually providing rules for classification is infeasible or inconvenient, an alternative method can be used by the system. The user may provide the original control program written for the physical process for reference and compare the similarity between the target program and the reference program. The similarity comparison is based on the graph structure of the automata generated from the two programs. Intuitively, this can be computed by counting the number of states and transitions that are common in both automata, then divided by the size of the automata (i.e., total number of states and transitions) to normalize the result. However, there are several challenges that may make this process difficult to implement. Recall that the state is defined as a combination of the output variables, the internal variables and the FBs' states. While the use of output variables is constrained by the connections to the physical output of the PLC, the use of the internal variables and FBs are less restrictive as long as the program's behavior (i.e., output) meets the requirement. In some cases, unused output may even be mapped to the internal variables to further complicate the situation. Hence the states in two automata usually cannot be directly compared for equality check. Similarly, transitions may not be directly compared because the use of timers and counters is at each programmer's discretion. To address these issues, the system processes the automata with the following steps:

Sanitize the state by masking the output, leaving only the connected output in the PLC;

Group the adjacent states which become the same from the sanitization into a "super node"; and Remove the transitions inside the "super node" from the automaton.

After the processing, the similarity score can be obtained by computing the maximum ratio of connected graph in the reference automaton which is also contained in the target automaton. One experimental embodiment used four standard programs as the reference programs. The experimental embodiment found that programs written for the same physical process but with different control objectives show slightly lower similarity, which is still much higher compared to the programs written for different processes. Moreover, the attack version of a program also shows a slightly lower similarity. This result indicates that the similarity-based classification is effective in measuring the likelihood which the target program belongs to a given category of physical process.

It has been found that SVM based classification has a higher accuracy while it needs more time to extract features from data and train on them. The rule-based method can be a sufficient choice if the time for training is too costly or when there is a lack of sufficient samples to train with. Additionally, the similarity-based technique can provide a convenient method for the user as an alternative. This is shown in the following table which shows results of classification. Training Time contains both feature generating and training. Predict Time is the average time spent on reading and predicting one single sample:

| Method | Training Time (s) | Predict Time (s) | Accuracy |
|---|---|---|---|
| SVM | 479 | 1.5 | 83.8% |
| Rule | — | 0.3 | 98.9% |

It has been found that in the attack version of a program (i.e., in a version of a PLC program where malicious code has been added), there is always an increase for triggers and a decrease for Average Degree. Increased usage of triggers is easy to understand: attackers usually need a timer or a counter for a conditional execution of the malicious logic. The Number of States in an attack version is usually no less than the number in the normal version, which indicates that there are fewer transitions detected in the attack version of the programs. In analyzing the programs and their automata, it has been found that malicious programs would hijack the control flow of a benign program and lead it to run the malicious logic, which bypassed some normal states and introduced the unsafe states. Besides, the malicious logic is usually simple and not as complicated as the intended functionality, which explains the decrease in the Average Degree and Degree Variance. Therefore, one can determine whether a program is malicious or not based on the result obtained by a classifier.

In addition, determining whether a program is malicious can rely on the rules formulated by system administrators. As discussed above, an intention of malicious logic is to lead the program to the unsafe states. These unsafe states can either be obtained from the system administrator or by monitoring the legitimate process.

In a rule-based detector, the administrator can make a rule wherein when the rules is applied in the emulator to a physical process controlled by the PLC, the detector indicates an unsafe state in the code segment when the emulator indicates that the automaton goes into a predetermined state in which the rule is violated. For example, when analyzing PLC code that controls the level in a tank, the administrator can impose on the emulator a rule such as "the tank's 'OUT' value must change periodically." The detector can then check the automaton to find whether the program would go into a loop where some of the tank's "OUT" value is always the same. If such is found, the system can generate an indication of suspected malicious code. One experiment found that the rule-based detector achieved the accuracy of 98.9% with higher efficiency. Therefore, using the rule-based malicious code detector can be more efficient and accurate.

As a framework designed based on the characteristics of the PLC, the system is no bound limited by large timers or counter values set by the attacker to hide the malicious code segment from regular checking. Whenever it detects the activation of such FBs, it will directly read the preset time/value from the data structure and override the FB to trigger the event being bidden. A useful application that can further extend the system is that it not only detects the malicious states, but also shows the attack path which the program takes to enter the malicious state. This can be done by a search for all paths between two states in the automaton. The first state can be the initial/reset state of the program, and the second state is the malicious state. The path contains the information required to reproduce the malicious behavior in a physical PLC in ICS, such as the inputs and time to wait for.

Another important feature of the system is that it is free of the path explosion problem which is often encountered in symbolic execution techniques. This is because the system does not rely on analyzing the feasible paths a program can take, which would result in infinite number of paths in case of programs with unbounded loop iterations. Instead, it runs the program and traverses through the automaton of the program based on concrete observation of the path which the program actually takes. As a result, the time it takes for the system to generate the automaton of a program is largely dependent on the size of the automaton. Because the system performs an exhaustive search of all possible inputs on each state, the time complexity would be $O(n*2^p*s)$, where n is the number of states, p is the number of inputs and s is the time to perform a single cycle scan. Although there is an exponential term $2^p$ in the big O notation, in reality, p is usually limited by the number of physical inputs on the PLC. This means that the system performs well even as the complexity of the program grows.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A system for detecting a malicious programmable logic controller (PLC) code segment in a PLC program corresponding to a specific type of PLC, the system comprising:
   (a) a binary parser that parses the code segment into a plurality of functional elements;
   (b) a variable and function block mapper that maps the functional elements into a high-level data structure;
   (c) a fuzzer that generates a behavioral model of the high-level data structure into an automaton;
   (d) a classifier that predicts to which processes the automaton corresponds; and
   (e) a detector that detects unsafe states in the automaton and that generates an indication of a detected unsafe state, wherein the automaton includes a directed multigraph that includes a plurality of states in which each state is represented as a node and in which each state transition is represented as an edge, in which the classifier indicates a total number of states in the automaton and average degree of the multigraph, wherein the average degree equals a total number of edges in multigraph divided by a total number of nodes in the multigraph.

2. The system of claim 1, wherein the fuzzer comprises an emulator that is programmed to emulate execution of the high-level data structure that is used to program the specific type of PLC by applying test case data to the high-level data structure and by detecting state transitions in the specific type of PLC.

3. The system of claim 2, wherein at least one rule is applied in the emulator to a physical process controlled by the PLC and wherein the detector indicates an unsafe state in the code segment when the emulator indicates that the automaton goes into a predetermined state in which the rule is violated.

4. The system of claim 2, wherein the emulator comprises a digital computer with a tangible non-volatile memory that includes a program that runs a model of the specific type of PLC.

5. The system of claim 1, wherein the fuzzer comprises an example of the specific type of PLC that has been programmed to run the high-level data structure and into which test case data is fed.

6. The system of claim 1, wherein the detector also detects paths leading to the unsafe states.

7. The system of claim 1, wherein the classifier predicts to which processes the automaton corresponds by comparing the average degree of the multigraph to average degrees of other known processes.

8. The system of claim 1, wherein the detector compares the average degree of the multigraph to an average degree of known safe code and wherein the system indicates that the code segment is suspicious when the average degree of the multigraph is less that the average degree of known safe code.

9. A method, operable on a digital computer that includes a tangible non-volatile memory, for detecting a malicious programmable logic controller (PLC) code segment in a PLC program corresponding to a specific type of PLC, comprising the steps of
   (a) parsing the code segment into a plurality of functional elements;
   (b) mapping the functional elements into a high-level data structure;
   (c) generating, with a fuzzer, a behavioral model of the high-level data structure into an automaton;
   (d) classifying the behavioral model so as to predict to which processes the automaton corresponds;
   (e) detecting unsafe states in the automaton and generating an indication of a detected unsafe state;
   (f) generating a multigraph so as to include a plurality of nodes and edges by representing each state as a node and by representing each state transition as an edge;
   (g) determining a total number of states in the automaton; and
   (h) determining an average degree of the multigraph, wherein the average degree equals a total number of edges in multigraph divided by a total number of nodes in the multigraph.

10. The method of claim 9, wherein the fuzzer comprises an emulator and further comprising the step of emulating with the emulator execution of the high-level data structure that is used to program the specific type of PLC by applying test case data to the high-level data structure and by detecting state transitions in the specific type of PLC.

11. The method of claim 10, further comprising the steps of:
   (a) applying at least one rule in the emulator to a physical process controlled by the PLC; and
   (b) indicating an unsafe state in the code segment when the emulator indicates that the automaton goes into a predetermined state in which the rule is violated.

12. The method of claim 10, wherein the emulator comprises a program run on the digital computer and further comprising the step of running a model of the specific type of PLC as part of the emulator.

13. The method of claim 9, wherein the fuzzer comprises an example of the specific type of PLC that has been programmed to run the high-level data structure and further comprising the step of feeding test case data into the example of the specific type of PLC.

14. The method of claim 9, further comprising the step of determining at least one path leading to the unsafe states.

15. The method of claim 9, further comprising the step of predicting to which processes the automaton corresponds by comparing the average degree of the multigraph to average degrees of other known processes.

16. The method of claim 9, further comprising the steps of:
   (a) comparing the average degree of the multigraph to an average degree of known safe code; and (b) indicating that the code segment is suspicious when the average degree of the multigraph is less that the average degree of known safe code.

* * * * *